(12) United States Patent
Chen

(10) Patent No.: US 8,792,933 B2
(45) Date of Patent: Jul. 29, 2014

(54) METHOD AND APPARATUS FOR DEPLOYING A WIRELESS NETWORK

(75) Inventor: Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 397 days.

(21) Appl. No.: 13/020,640

(22) Filed: Feb. 3, 2011

(65) Prior Publication Data

US 2011/0222434 A1 Sep. 15, 2011

Related U.S. Application Data

(63) Continuation-in-part of application No. 12/884,377, filed on Sep. 17, 2010.

(60) Provisional application No. 61/312,415, filed on Mar. 10, 2010.

(51) Int. Cl.
*H04B 7/00* (2006.01)

(52) U.S. Cl.
USPC ........... 455/524; 455/453; 455/444; 455/522; 370/254

(58) Field of Classification Search
USPC ........ 455/524, 444, 456.5, 16, 517, 561, 420, 455/428, 410, 432.3, 450, 433, 435, 446, 455/436, 7, 515, 552.1, 90.2, 121, 453; 370/254, 328, 480, 237, 222, 345, 310, 370/235, 338, 352
See application file for complete search history.

(56) References Cited

U.S. PATENT DOCUMENTS

| 4,916,460 | A | | 4/1990 | Powell | |
|---|---|---|---|---|---|
| 5,867,491 | A | * | 2/1999 | Derango et al. | 370/329 |
| 5,953,325 | A | | 9/1999 | Willars | |
| 6,341,214 | B2 | | 1/2002 | Uesugi | |
| 6,628,946 | B1 | * | 9/2003 | Wiberg et al. | 455/434 |
| 7,313,113 | B1 | | 12/2007 | Hills | |
| 8,213,401 | B2 | * | 7/2012 | Fischer et al. | 370/345 |
| 2002/0077112 | A1 | * | 6/2002 | McIntosh et al. | 455/453 |
| 2003/0119501 | A1 | * | 6/2003 | Kim | 455/433 |
| 2005/0105534 | A1 | | 5/2005 | Osterling | |

(Continued)

FOREIGN PATENT DOCUMENTS

WO    WO 2009/088328    7/2009

OTHER PUBLICATIONS

Siavash M. Alamouti, "A Simple Transmit Diversity Technique for Wireless Communications," *IEEE Journal on Select Areas in Communications*, vol. 16, No. 8, Oct. 1998.

(Continued)

*Primary Examiner* — Tran Trinh
(74) *Attorney, Agent, or Firm* — Baker Botts L.L.P.

(57) ABSTRACT

A method for deploying a wireless network in accordance with particular embodiments includes deploying one or more base stations configured to provide wireless connections between the one or more base stations and one or more endpoints. The method also includes deploying one or more remote transceivers configured to provide wireless connections between the one or more remote transceivers and one or more endpoints. The method further includes modifying at least one base station of the one or more base stations. The modified base station is configured to control the one or more remote transceivers. The method additionally includes modifying at least one remote transceiver of the one or more remote transceivers. The modified remote transceiver is configured to control the at least one remote transceiver without receiving control information from the at least one base station.

9 Claims, 6 Drawing Sheets

(56) References Cited

U.S. PATENT DOCUMENTS

| | | | |
|---|---|---|---|
| 2005/0157675 A1* | 7/2005 | Feder et al. | 370/328 |
| 2006/0209752 A1* | 9/2006 | Wijngaarden et al. | 370/328 |
| 2007/0019679 A1* | 1/2007 | Scheck et al. | 370/480 |
| 2007/0041464 A1 | 2/2007 | Kim et al. | |
| 2008/0293446 A1* | 11/2008 | Rofougaran | 455/552.1 |
| 2009/0061939 A1 | 3/2009 | Andersson et al. | |
| 2009/0135966 A1 | 5/2009 | Fischer et al. | |
| 2009/0170437 A1 | 7/2009 | Bhattad et al. | 455/63.1 |
| 2009/0201871 A1* | 8/2009 | Sambhwani et al. | 370/329 |
| 2009/0202020 A1 | 8/2009 | Hafeez | |
| 2009/0252108 A1 | 10/2009 | Watanabe | |
| 2010/0035600 A1 | 2/2010 | Hou et al. | 455/422.1 |
| 2010/0265842 A1 | 10/2010 | Khandekar et al. | |
| 2011/0034175 A1 | 2/2011 | Fong et al. | |
| 2011/0189999 A1* | 8/2011 | Mueck | 455/450 |
| 2011/0223960 A1* | 9/2011 | Chen et al. | 455/522 |
| 2012/0069882 A1* | 3/2012 | Nino et al. | 375/222 |
| 2012/0163179 A1* | 6/2012 | Jo et al. | 370/237 |
| 2012/0214550 A1* | 8/2012 | Galaro et al. | 455/561 |
| 2012/0220214 A1* | 8/2012 | Du et al. | 455/7 |
| 2012/0309349 A1* | 12/2012 | Schmidt et al. | 455/410 |
| 2013/0150046 A1* | 6/2013 | Gogic et al. | 455/436 |

OTHER PUBLICATIONS

Liang Sun et al., "Analytical Performance of MIMO Multichannel Beamforming in the Presence of Unequal Power Cochannel Interference and Noise," *IEEE Transactions on Signal Processing*, vol. 57, No. 7, Jul. 2009.

Shidong Zhou et al., "Distributed Wireless Communication System: A New Architecture for Future Public Wireless Access," *IEEE Communications Magazine*, Mar. 2003.

Wei Feng et al., "Downlink Capacity of Distributed Antenna Systems in a Multi-Cell Environment," © 2009 IEEE.

Wan Choi, et al., "Downlink Performance and Capacity of Distributed Antenna Systems in a Multicell Environment," *IEEE Transactions on Wireless Communications*, vol. 6, No. 1, Jan. 2007.

David Tse et al., "Fundamentals of Wireless Communications," Aug. 13, 2004.

Daniel Perez Palomar et al., "Joint Tx-Rx Beamforming Design for Multicarrier MIMO Channels: A Unified Framework for Convex Optimization," *IEEE Transactions on Signal Processing*, vol. 51, No. 9, Sep. 2003.

Yue Rong et al., "Space-Time Power Schedule for Distributed MIMO Links without Instantaneous Channel State Information at the Transmitting Nodes," *IEEE Transactions on Signal Processing*, vol. 56, No. 2, Feb. 2008.

3GPP TR 36.942 V9.2.0 (Dec. 2009) 3rd Generation Partnership Project; Technical Specification Group Radio Access Network; Evolved Universal Terrestrial Radio Access (E-UTRA); Radio Frequency (RF) System Scenarios; (Release 9), Dec. 2009.

3GPP TR 36.300 V9.2.0 (Dec. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

CPRI Specification V4.1 (Feb. 18, 2009), Common Public Radio Interface (CPRI); Interface Specification.

Gerry Leavey, PMC-Sierra, "Enabling Distributed Base Station Architectures with CPRI," Issue No. 1, Feb. 2006.

"Distributed Antenna System," from Wikipedia, the free encyclopedia, downloaded from http://en.wikipedia.org/wiki/Distributed_Antenna_System, on Sep. 17, 2010.

Wei-Peng Chen et al., "System and Method for Implementing Power Distribution," U.S. Appl. No. 12/879,884, filed Sep. 10, 2010.

PCT Notification of Transmittal of the International Search Report and the Written Opinion of the International Searching Authority, or the Declaration mailed May 31, 2011 re PCT/US2011/026405 filed Feb. 28, 2011.

PCT Notification of Transmittal of the International Search Report and the Written Opinion of the International Searching Authority, or the Declaration mailed Jun. 7, 2011 re PCT/US2011/027332 filed Mar. 7, 2011.

PCT Notification of Transmittal of the International Search Report and the Written Opinion of the International Searching Authority, or the Declaration mailed Jun. 7, 2011 re PCT/US2011/027331 filed Mar. 7, 2011.

Chen et al., U.S. Appl. No. 12/879,884, filed Sep. 10, 2010, "System and Method for Implementing Power Distribution" patent application.

Chen et al., U.S. Appl. No. 12/909,151, filed Oct. 21, 2010, "System and Method for Implementing Power Distribution" patent application.

Chen et al., U.S. Appl. No. 12/956,710, filed Nov. 30, 2011, "System and Method for Implementing Power Distribution" patent application.

PCT Invitation to Pay Additional Fees and, Where Applicable, Protest Fee, mailed Jul. 14, 2011 regarding PCT/US2011/031666.

PCT Notification of Transmittal of the International Search Report and the Written Opinion of the International Searching Authority, or the Declaration mailed Oct. 18, 2011 regarding PCT/US2011/031666.

Chen, U.S. Appl. No. 12/879,884, U.S. Non=final Office Action, Aug. 12, 2013.

Korean Intellectual Property Office Notice of Preliminary Rejection for Korean Patent Application No. 10-2012-7026379, Oct. 30, 2013.

KIPO's Notice of Preliminary Rejection for Korean Patent Application No. 10-2012-7023612, Jan. 23, 2014.

\* cited by examiner

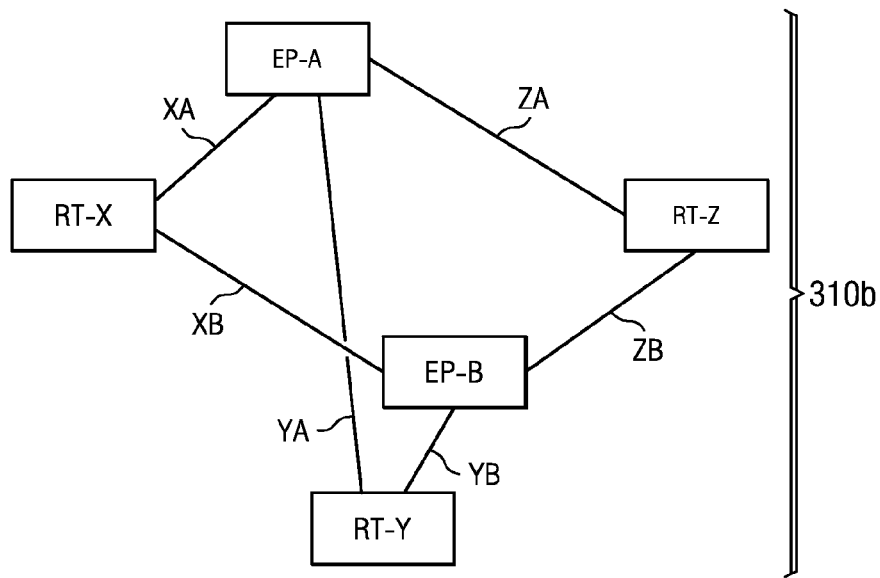

$$K_{RM} = \begin{bmatrix} XA = 5 & XB = 4 \\ YA = 8 & YB = 1 \\ ZA = 7 & ZB = 6 \end{bmatrix} \Bigg\} 315b$$

$$\overbrace{\phantom{320b\text{-}1}}^{320b\text{-}1} \quad \overbrace{\phantom{320b\text{-}2}}^{320b\text{-}2} \quad \overbrace{\phantom{320b\text{-}3}}^{320b\text{-}3}$$

$$P = \begin{bmatrix} 0 & 0 \\ 0 & 0 \\ 0 & 0 \end{bmatrix} => \begin{bmatrix} 1 & 0 \\ 1 & 0 \\ 1 & 0 \end{bmatrix} => \begin{bmatrix} 1 & 0 \\ 1 & 0 \\ 1 & 1 \end{bmatrix} \Bigg\} 320b$$

$$A = \begin{bmatrix} 5 & 8 & 7 & 0 & 0 & 0 & -5 & 0 & 0 \\ 5 & 8 & 7 & 0 & 0 & 0 & 0 & -8 & 0 \\ 5 & 8 & 7 & 0 & 0 & 0 & 0 & 0 & -7 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 4 & 1 & 6 & 0 & 0 & -6 \\ Q & 0 & 0 & Q & 0 & 0 & 0 & 0 & 0 \\ 0 & Q & 0 & 0 & Q & 0 & 0 & 0 & 0 \\ 0 & 0 & Q & 0 & 0 & Q & 0 & 0 & 0 \end{bmatrix} \quad B = \begin{bmatrix} -1 \\ -1 \\ -1 \\ 0 \\ 0 \\ -1 \\ N \\ N \\ N \end{bmatrix} \Bigg\} 325b$$

METHOD AND APPARATUS FOR DEPLOYING A WIRELESS NETWORK

RELATED APPLICATIONS

This application claims the benefit under 35 U.S.C. §119 (e) of U.S. Provisional Application Ser. No. 61/312,415, filed Mar. 10, 2010 and entitled "Method and System for Enhancing Capability of Distributed Antenna System." This application is a continuation-in-part of prior application Ser. No. 12/884,377 filed Sep. 17, 2010 and entitled "System and Method for Implementing Power Distribution."

TECHNICAL FIELD OF THE INVENTION

This invention relates in general to wireless networks and, more particularly, to a method and apparatus for deploying a wireless network.

BACKGROUND OF THE INVENTION

Distributed antenna systems consist of a base station (also known as a Radio Element Control or a Baseband Unit) and one or more remote transceivers (also known as Radio Elements or Remote Radio Heads). These components provide endpoints with wireless network access. To aid the distributed antenna system in distinguishing between the various wireless transmissions to and from the various endpoints, each endpoint may have one or more unique subcarriers assigned thereto.

Within a distributed antenna system, the remote transceivers are distributed around different geographic locations while being connected via a wired connection (e.g., optical fiber) to the base station. Wile there may be multiple remote transceivers, from the perspective of an endpoint there is only one entity, the base station. That is, each remote transceiver transmits essentially the same core data, and the endpoint combines multiple signals from multiple remote transceivers into a single communication.

The base station communicates with the remote transceivers using, for example, the Common Public Radio Interface (CPRI) standard. The CPRI standard allows in-phase/quadrature (I/Q) data to be transmitted from the base station to the remote transceivers. The remote transceivers use the I/Q data to form the transmissions that are sent to any endpoints connected thereto. The remote transceivers are also able to communicate with the base station using the CPRI standard. This allows the remote transceivers to relay data received from the endpoints and to communicate control information, such as signal quality, to the base station.

SUMMARY

In accordance with a particular embodiment, a method for deploying a wireless network in accordance with particular embodiments includes deploying one or more base stations configured to provide wireless connections between the one or more base stations and one or more endpoints. The method also includes deploying one or more remote transceivers configured to provide wireless connections between the one or more remote transceivers and one or more endpoints. The method further includes modifying at least one base station of the one or more base stations. The modified base station is configured to control the one or more remote transceivers. The method additionally includes modifying at least one remote transceiver of the one or more remote transceivers. The modified remote transceiver is configured to control the at least one remote transceiver without receiving control information from the at least one base station.

Technical advantages of particular embodiments may include deploying and modifying components of a wireless network in response to network load. Accordingly, wireless service providers may be able to grow, expand, and improve their network in a more economically viable fashion. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which:

FIG. 3B illustrates several sample models to help illustrate corresponding steps in the method depicted in FIG. 3A, in accordance with a particular embodiment;

DETAILED DESCRIPTION

Figure 1:
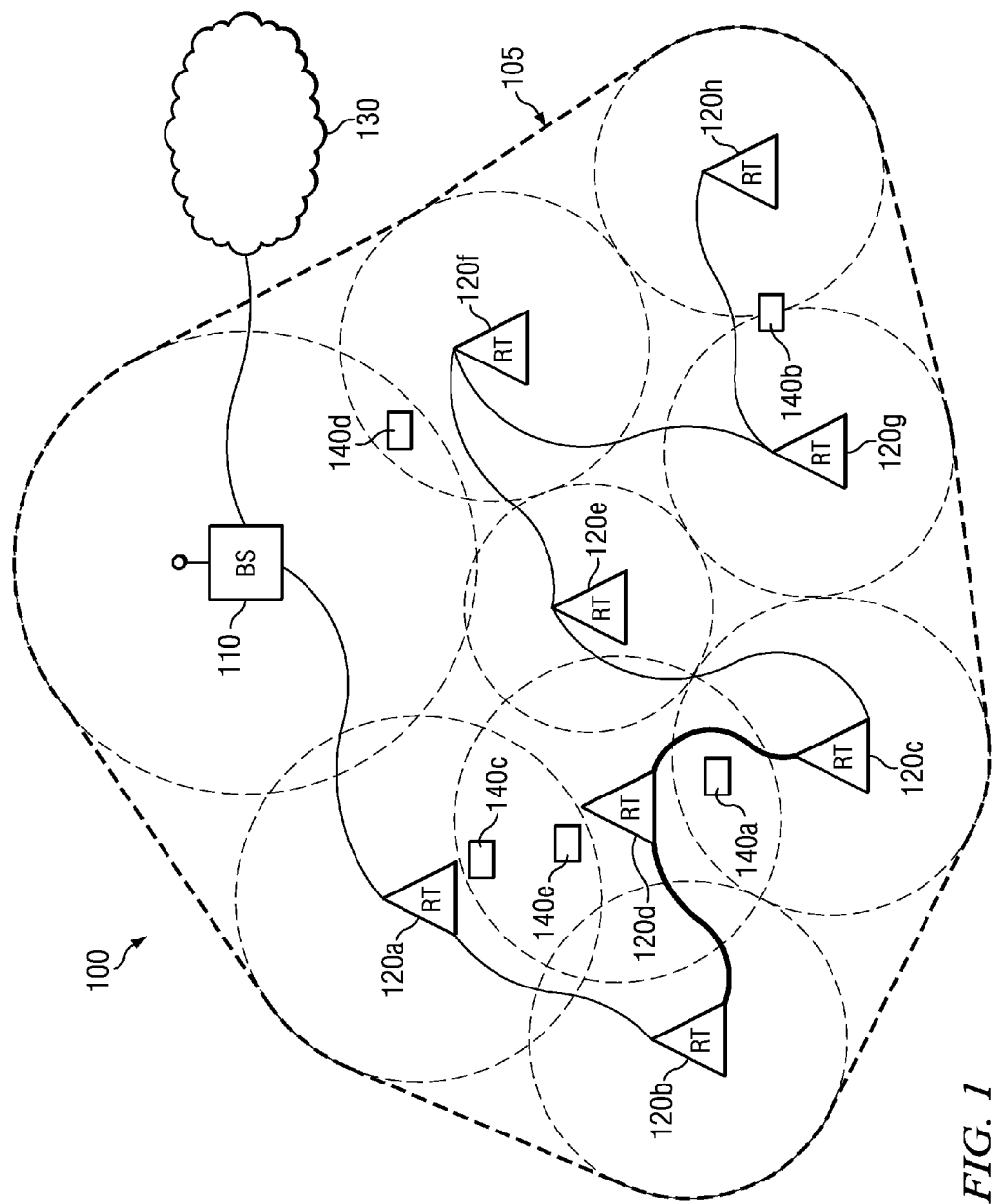
FIG. 1 illustrates a distributed antenna system comprising a base station and a plurality of remote transceivers, in accordance with a particular embodiment.

FIG. 1 illustrates a distributed antenna system comprising a base station and a plurality of remote transceivers, in accordance with a particular embodiment. Distributed antenna system 100 comprises base station 110 and multiple remote transceivers 120. Wireless communications may be transmitted by remote transceivers 120 at varying power levels to different endpoints. For example, more power may be allocated to an endpoint that is closer to a remote transceiver. This may be based on the notion that the benefit of increasing the transmission power to a nearby endpoint is greater than the resulting loss from decreasing the transmission power to a distant endpoint. The power of a particular transmission, comprising one or more subcarriers, from a particular remote transceiver (e.g. remote transceiver 120*d*) to a particular endpoint (e.g., endpoint 140*c*) may depend on the signal quality between the particular endpoint and the particular remote transceiver. The transmission power of each subcarrier at each remote transceiver may be greater than or less than a standard power level. The standard power level may be based on an equal distribution of power among the subcarriers (e.g., all transmissions are transmitted with the same power). Increasing or decreasing the transmission power for each endpoint 140 at each remote transceiver 120 may increase the capacity of distributed antenna system 100 as compared to a system utilizing uniform power across all subcarriers.

In particular embodiments, a service provider may employ distributed antenna system 100 as a starting point or intermediary point in their long term deployment plans. For example, a service provider may enter a new area or introduce a new wireless technology by first deploying a few macro base stations. As the service provider grows the wireless service it may add one or more distributed antenna systems or replace one or more macro base stations with distributed antenna systems. As growth continues, one or more distributed antenna systems may eventually be replaced with pico base stations. The pico base stations may be added gradually (e.g., selecting a few remote transceivers at a time to be replaced with pico base stations) or all at once (e.g., the whole distributed antenna system is replaced with several pico base stations. Each change may yield an increase in overall system capacity and/or coverage area.

In general, the overall system capacity of a wireless system increases when the cell size is reduced. The cell size refers to the coverage area associated with a node (e.g., a macro base station or a pico base station). For example, coverage area 105 may correspond to the cell size of distributed antenna system 100. A pico base station based system may comprise cell throughput density (in the unit of bps per square meter) that is higher than the distributed antennae system because the coverage area of a pico base station cell is smaller than, for example, coverage area 105 of distributed antennae system 100. Although distributed antenna system 100 may have a higher per cell throughput compared to the pico base station system, the cell throughput density is lower because of the increased coverage area.

The cost associated with the different types of equipment varies. For example, a macro base station, comprising powerful processors and high power RF amplifiers, is typically more expensive than a base station comprising a relatively less powerful processor for a remote transceiver controller without any RF amplifiers. A pico base station, comprising less powerful processors and lower power RF amplifiers, has a cost somewhere between a macro base station and a remote transceiver that includes a lower power RF amplifier and an even less powerful processor.

In general, the price of new equipment decreases over time as the technology matures. However, different types of equipment decrease at different rates. For example, the price of macro base stations changes at a slower rate than the price of a pico base stations. Moreover, the lower costs associated with small base stations, such as pico base stations, typically invites more vendors to supply the small base stations. The increased competition further accelerates price drops.

There are also costs associated with site acquisition, hardware management, and the backhaul connection. With respect to site acquisition costs, the low number of macro base stations results in typically low site acquisition costs where as the large number of pico base stations results in typically high site acquisition costs (the site acquisition costs associated with distributed antenna system 100 typically falls somewhere in the middle). Because of the larger cell size, the management costs of a macro base station based system and distributed antenna system 100 is lower than a pico base station based system. Because of the increased capacity of distributed antenna system 100 and a pico base station based system, the backhaul costs are greater than they are for a macro base station based system.

From the foregoing it may be seen that distributed antenna system 100 provides system capacity and has an associated cost that is between that of a macro base station based system and a pico base station based system. The deployment scheme, in accordance with certain embodiments, may take advantage of a trade-off between system performance, such as system capacity, and the cost to grow the wireless network in a cost effective manner. When a wireless service provider starts to provide wireless service to a new area or introduce a new wireless technology (e.g. LTE service) to an existing service area, it may begin by deploying a few macro base stations, such as base station 110. Each macro base station may comprise the features and capabilities needed to provide wireless service within its associated coverage area. In this stage, there may be a relatively low number subscribers for the new service placing a relatively small demand on the capacity of the system. Using a few macro base stations, the wireless service provider may be able to provide coverage over a relatively large geographic area in a relatively short deployment time frame. While the macro base stations may be expensive, the relatively slow rate at which their cost comes down make the macro base stations a prudent early investment.

When the wireless service provider begins to grow the coverage area, fill in gaps in the coverage area, or increase system capacity to meet customer demand, the service provider may convert one or more of the macro base stations, such as base station 110, into a distributed antenna base station (e.g., a remote transceiver controller). One or more remote transceivers 120 may then be added and connected to base station 110. The wireless service provider may be able to add additional remote transceivers 120 over time to increase or improve the coverage or capacity of distributed antenna system 100.

In some embodiments, converting base station 110 from a macro base station to a remote transceiver controller may comprise adding a new module to base station 110. For example, the new module may comprise a processor configured to convert signals between baseband signals and CPRI I/Q samples. This may allow for communication with remote transceivers over CPRI. The processor may also be used in determining non-uniform power distribution for the remote transceivers coupled to the base station 110. In some embodiments, a CPRI optical interface may be added to base station 110 during the conversion to a remote transceiver controller. The optical interface may be a component of the new module added to base station 110.

In some scenarios, instead of converting base station 110 from a macro base station to a remote transceiver controller, the remote transceiver controller functionality may be added on top of the existing macro base station. For example, if the form factor of base station 110 is a standard rack mounting form factor, it may be easy to add a remote transceiver controller to the rack used by base station 110. This may allow base station 110 to function as both a macro base station and a remote transceiver controller for distributed antenna system 100. In some embodiments, the wireless service provider may deploy fiber optic connections to remote transceivers 120. The fiber optic connections may subsequently be used by pico base stations for their backhaul connection.

Eventually, as the wireless network continues to grow, the wireless service provider may decide to convert one or more of the remote transceivers to pico base stations. In some embodiments, this may be done by adding a module to a remote transceiver. For example, the module may comprise a processor that is configured to handle baseband signals, media access control (MAC) signaling (e.g., addressing, channel access control, scheduling, etc.), and networking processes, such as IP networking processes. In some embodiments, converting a remote transceiver to a pico base station may convert the wired connection of the remote transceiver from a CPRI connection to an IP connection for the pico base station.

In particular embodiments, the above upgrade approach may allow a wireless service provider to grow their network in an incremental approach that better matches the traffic demand and revenue of the wireless network. This approach may better distribute and/or reduce the cost of the wireless network to the wireless service provider. For example, in certain scenarios, the demand for more capacity may increase at a rate that approximates the rate at which the underlying technologies mature. The above upgrade approach may allow the wireless service provider to delay installing pico base stations until their cost is lower, as compared to when the wireless service provider first began deploying the wireless service.

The above upgrade approach also provides the wireless service provider with greater deployment flexibility compared to a traditional deployment technique in which more and more macro or pico base stations are added.

In some embodiments, such as where the wireless service provider is replacing an existing wireless service with a new wireless service, the wireless service provider may forego installing macro base stations and may jump directly to installing distributed antenna system 100 or a pico base station based system. In doing so, the wireless service provider may use optical or other backhaul connections installed in its previous generation of wireless systems. Without the cost of installing backhaul connections, the price of distributed antenna system 100 would be cost competitive with a macro base station installation while providing higher system capacity compared to the macro base station based system.

In certain embodiments, base station 110 may be able to quickly determine an optimum distribution of power for each endpoint 140 at each remote transceiver 120. For example, base station 110 may determine the optimum distribution by solving a convex optimization problem using an intelligent heuristic algorithm that is able to be run in polynomial time. The non-uniform distribution of power to different subcarriers at different remote transceivers may increase the capacity of distributed antennas system 100, as compared to a blanket transmission scheme in a traditional distributed antenna system.

Distributed antenna system 100 may be coupled to network 130 via base station 110. Distributed antenna system 100 may provide wireless coverage for endpoints 140 over a large geographic area. For example, a single base station (e.g., base station 110) and a plurality of remote transceivers (e.g., remote transceivers 120) may be used to provide wireless coverage for an entire building. In distributed antenna system 100, remote transceivers 120 may differ from relay stations in that they have a wired connection to base station 110 as opposed to a wireless connection as used by traditional relay stations. In some embodiments, remote transceivers 120 may initially comprise reduced intelligence compared to relay stations or base stations. As the service provider grows the wireless network and converts remote transceivers 120 to pico base stations, the service provider may add or replace modules within the remote transceivers to increase their intelligence (e.g., convert them to pico base stations). In some embodiments, base station 110 and remote transceivers 120 may together comprise the functionality of a traditional macro base station, wherein base station 110 comprises the logic to manage the wireless connections with endpoints 140 (e.g., assign channels and power levels) and remote transceivers 120 may comprise the components for communicating with the endpoints (e.g., radios, amplifiers, analog-to-digital and digital-to-analog converters). Distributed antenna system 100 may reduce the operational and deployment cost by reducing the radiated power (e.g., spreading remote transceivers 120 over a wide area eliminates the need for a powerful central transceiver to cover the same wide area) and providing deployment flexibility (e.g., remote transceivers 120 may be small in size compared to other types of relay stations, repeaters or macro base stations).

In some embodiments, remote transceivers 120 may be part of a long term deployment plan. For example, when a wireless service provided first brings wireless service to a new area, it may begin by deploying a few macro base stations. Each macro base station may comprise all the features and capabilities needed to provide wireless service within its associated coverage area. When the service provider begins to grow the coverage area, fill in gaps in its coverage area, or respond to increased demand within its coverage area, the service provider may convert one or more of the macro base stations into distributed antenna base stations (e.g., base station 110) and add one or more remote transceivers. The conversion may comprise adding a new module to the macro base station. The wireless service provider may then add additional remote transceivers as needed. Eventually, the wireless service provider may decide to convert the remote transceivers to pico base stations. This may be done by simply adding a module to the remote transceivers and converting the backhaul connections of remote transceivers from CPRI connections to IP connections. This upgrade approach allows a service provider to grow their network in an incremental approach. This may reduce the cost for the wireless service provider and provides greater deployment flexibility compared to traditional deployment techniques of simply adding more macro or pico base stations.

Because remote transceivers 120 are distributed over a geographical area, the distance between an endpoint and each remote transceiver 120 may be different. In particular embodiments, the signal quality between an endpoint and a remote transceiver may generally increase as the endpoint gets closer to the remote transceiver. Particular embodiments may take advantage of this increased signal quality by increasing the transmission power for the subcarriers associated with the signal having the better signal quality. Because a remote transceiver has a finite amount of transmission power, an increase in power for a particular subcarrier may be balanced by a corresponding decrease in power of another subcarrier. One possible way in which base station 110 may estimate how close an endpoint is to one or more of remote transceivers 120 is to estimate the dominant part of a channel response (e.g., slow fading) associated with the endpoint. In some embodiments, remote transceivers 120 may include a module which is capable of measuring the received signal power.

Depending on the embodiment, distributed antenna system 100 may use any of a variety of wireless technologies or protocols (e.g., IEEE 802.16m or 802.16e, or long term evolution (LTE)) for communications between remote transceivers 120 and endpoints 140. The multiple remote transceivers 120 appear to endpoints 140 as a single entity—an extension of base station 110. Thus, each remote transceiver 120 may attempt to send the same core data to endpoints 140 and may potentially receive the same data from endpoints 140. The differences in the data that is sent or received may be the result of the respective distances of each remote transceiver 120 from a particular endpoint and, as will be discussed in more detail below, the amount of power applied to each subcarrier at each remote transceiver.

Depending on the embodiment, distributed antenna system 100 may use any of a variety of different wired technologies or protocols (e.g., CPRI) for communications between remote transceivers 120 and base station 110. In particular embodiments, base station 110 may be configured to adjust the power, either directly (e.g., by incorporating the power distribution in the I/Q samples that are sent to the remote transceivers) or indirectly (e.g., by providing power distribution values to each remote transceiver from which the remote transceivers can determine their respective power distribution), that each remote transceiver applies to its transmissions. By selectively increasing or decreasing the transmission power for particular sub-carriers (associated with particular endpoints) at particular remote transceivers, base station 110 may be able to more efficiently use the available wireless resources.

Depending on the embodiment, base station 110 may use signal quality information from the various remote transceivers to determine the power distribution for each sub-carrier for each remote transceiver 120. The signal quality information may include the received uplink power strength, the maximal usable modulation and coding scheme (MCS) level, the carrier to interference-plus-noise ratio (CINR) of the wireless connection, and/or the signal to interference plus noise ratio (SINR) of the wireless connection. In particular embodiments, uplink sounding may be used to estimate the channel gain and interference strength between endpoints 140 and remote transceivers 120.

Network 130 may be any network or combination of networks capable of transmitting signals, data, and/or messages, including signals, data or messages transmitted through WebPages, e-mail, text chat, voice over IP (VoIP), and instant messaging. Network 130 may include one or more LANs, WANs, MANs, PSTNs, WiMAX networks, global distributed networks such as the Internet, Intranet, Extranet, or any other form of wireless or wired networking. Network 130 may use any of a variety of protocols for either wired or wireless communication.

Base station 110 may include any combination of hardware, software embedded in a computer readable medium, and/or encoded logic incorporated in hardware or otherwise stored (e.g., firmware) to implement any number of communication protocols that allow for the wireless exchange of packets in distributed antenna system 100. Depending on the deployment, base station 110 may be configured as a macro base station, a remote transceiver controller, or both a macro base station and a remote transceiver controller. In the depicted embodiment, base station 110 is configured as a macro base station and as a remote transceiver controller. As a remote transceiver controller, base station 110 may be configured to determine and distribute a power distribution to each remote transceiver 120. Depending on the embodiment, base station 110 may apply the power distribution to the data before it is sent to the remote transceivers for transmission or base station 110 may allow each remote transceivers 120 to individually apply the power distribution.

Remote transceivers 120 may include any combination of hardware, software embedded in a computer readable medium, and/or encoded logic incorporated in hardware or otherwise stored (e.g., firmware) to implement any number of communication protocols that allow for the wireless exchange of packets with endpoints 140 in distributed antenna system 100. Depending on the deployment, remote transceivers 120 may be configured as pico base stations, remote transceivers, or both pico base stations and remote transceivers. In the depicted embodiment, remote transceivers 120 are configured as remote transceivers. In some embodiments, remote transceivers 120 receive data from base station 110 that may already include the power distribution determinations made by base station 110. In particular embodiments, each remote transceiver 120 may adjust the transmission power of the core data received from base station 110. The adjustments may be made based on one or more control signals sent from base station 110 specifying the transmission power for each sub-carrier, or plurality of sub-carriers, at each respective remote transceiver 120.

Endpoints 140 may comprise any type of wireless device able to send and receive data and/or signals to and from base station 110 via remote transceivers 120. Some possible types of endpoints 140 may include desktop computers, PDAs, cell phones, laptops, and/or VoIP phones. Endpoints 140 may provide data or network services to a user through any combination of hardware, software embedded in a computer readable medium, and/or encoded logic incorporated in hardware or otherwise stored (e.g., firmware). Endpoints 140 may also include unattended or automated systems, gateways, other intermediate components or other devices that can send or receive data and/or signals.

The following example may help illustrate particular features of certain embodiments. For purposes of this example, assume that base station 110 only controls two remote transceivers, remote transceivers 120a and 120d. Further assume that endpoints 140c and 140e are both located in the area served by remote transceivers 120a and 120d. To simplify the scenario, assume that the scheduling algorithm at base station 110 allocates the same number of subcarriers in a frame to each of endpoints 140c and 140e. Further assume that the magnitude of the channel gain between remote transceiver 120a and endpoint 140c is twice that of remote transceiver 120a and endpoint 140e; and that the magnitude of the channel gain between remote transceiver 120d and endpoint 140e is twice that of remote transceiver 120d and endpoint 140c. Based on these assumptions, base station 110 may allocate ⅔ of remote transceiver 120a's power to the subcarriers used by endpoint 140c and ⅓ to the subcarriers used by endpoint 140e (as opposed to the even ½ and ½ distribution of a standard distributed antenna system). Similarly, base station 110 may allocate ⅔ of remote transceiver 120d's power to the subcarriers used by endpoint 140e and ⅓ to the subcarriers used by endpoint 140c.

Although FIG. 1 illustrates a particular number and configuration of endpoints, connections, links, and nodes, distributed antenna system 100 contemplates any number or arrangement of such components for communicating data. In addition, elements of distributed antenna system 100 may include components centrally located (local) with respect to one another or distributed throughout distributed antenna system 100.

Figure 2:
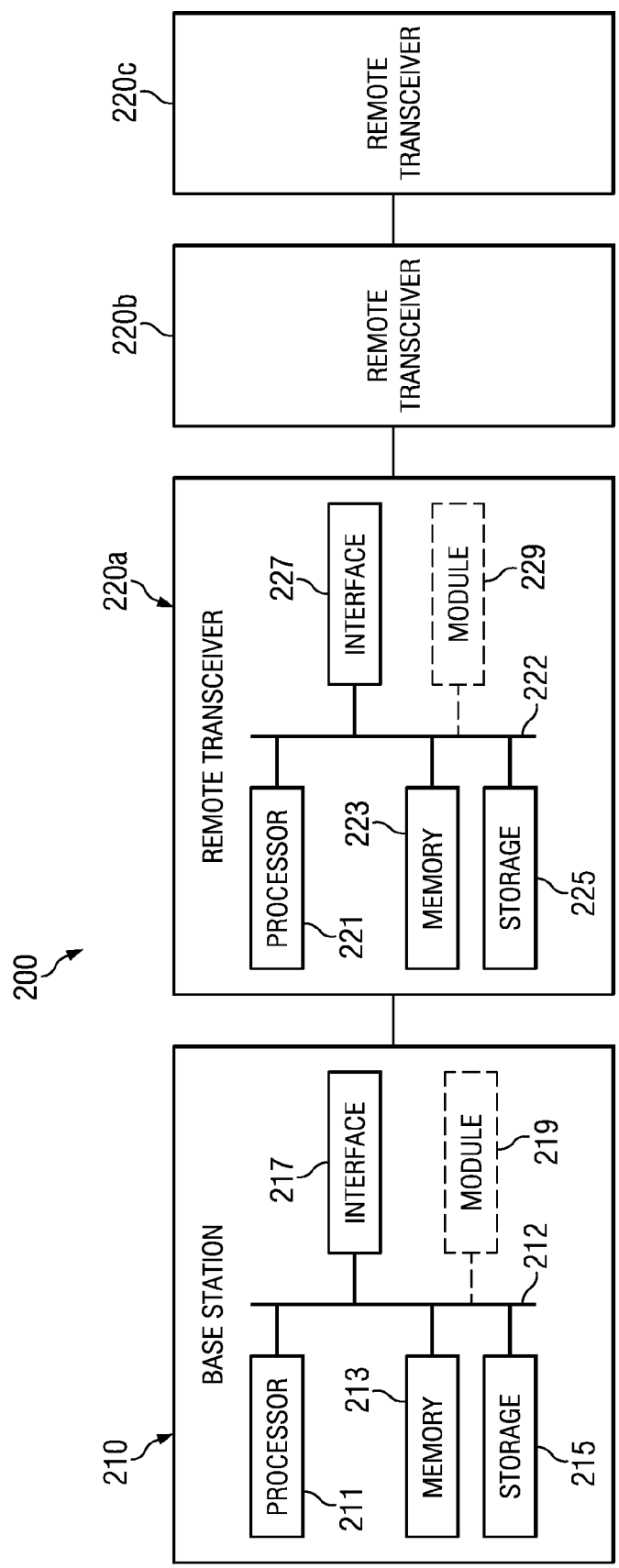
FIG. 2 illustrates a detailed block diagram of a base station and a remote transceiver within a distributed antenna system, in accordance with a particular embodiment.

FIG. 2 illustrates a detailed block diagram of a base station and a remote transceiver within a distributed antenna system, in accordance with a particular embodiment. Distributed antenna system 200 may be used with any of a variety of different wireless technologies, including, but not limited to, orthogonal frequency division multiple access (OFDMA), next generation wireless system such as LTE-A and 802.16m. The depicted distributed antenna system 200 is particular phase of a wireless network deployment scheme. Depending on the scenario, distributed antenna system 200 may be the first phase of a two-phase deployment scheme or the second phase of a three-phase deployment scheme.

Distributed antenna system 200 includes base station 210 and remote transceivers 220. Base station 210 and remote transceivers 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of base station 210 and remote transceiver 220 may comprise any suitable physical form, configuration, number, type and/or layout. As an example, and not by way of limitation, base station 210 and/or remote transceiver 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, base station 210 and/or remote transceiver 220 may include one or more computer systems; be unitary or distributed; span multiple locations; span multiple machines; or reside in a cloud, which may include one or more cloud components in one or more networks.

Where appropriate, distributed antenna system 200 may perform without substantial spatial or temporal limitation one or more steps of one or more methods described or illustrated herein. As an example, and not by way of limitation, distributed antenna system 200 may perform in real time or in batch mode one or more steps of one or more methods described or illustrated herein. One or more distributed antenna systems may perform at different times or at different locations one or more steps of one or more methods described or illustrated herein, where appropriate.

In the depicted embodiment, base station 210 and remote transceiver 220 each include their own respective processors 211 and 221, memory 213 and 223, storage 215 and 225, interfaces 217 and 227, and buses 212 and 222. Base station 210 and remote transceiver 220 are shown with the optional module 219 and module 229 which may be used in certain embodiments. These components may work together to provide a distributed antenna system in which the power distribution for each endpoint at each remote transceiver 220 is distributed based on a relative signal quality for each endpoint at each remote transceiver. Although a particular distributed antenna system is depicted having a particular number of particular components in a particular arrangement, this disclosure contemplates any suitable distributed antenna system 200 having any suitable number of any suitable components in any suitable arrangement. For simplicity, similar components of base station 210 and remote transceiver 220 will be discussed together wherein the components of remote transceiver 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components, (e.g., memory 213 or 223, respectively) wireless networking functionality. Such functionality may include providing various wireless features discussed herein. For example, processor 211 may determine how to allocate power for each sub-carrier at each remote transceiver 220. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. Memory 213 (and/or 223) may store any suitable data or information utilized by base station 210 (and/or remote transceiver 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. As an example and not by way of limitation, base station 210 may load instructions from storage 215 (and/or 225) or another source (such as, for example, another computer system, another base station, or a remote transceiver) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

Bus 212 (and/or 222) may include any combination of hardware, software embedded in a computer readable medium, and/or encoded logic incorporated in hardware or otherwise stored (e.g., firmware) to couple components of base station 210 (and/or remote transceiver 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (USA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses, as described below. In particular embodiments, one or more memory management units (MMUs) may reside between processor 211 (and/or 221) and memory 213 (and/or 223) and facilitate accesses to memory 213 (and/or 223) requested by processor 211 (and/or 221). In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate.

In particular embodiments, storage 215 (and/or 225) may include mass storage for data or instructions. As an example and not by way of limitation, storage 215 (and/or 225) may include an HDD, a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to base station 210 (and/or remote transceiver 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between base station 210, remote transceivers 220, any endpoints (not depicted) being serviced by base station 210, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

In some embodiments, interface 217 (and/or 227) may comprise one or more radios coupled to one or more antennas. In such embodiments, interface 217 (and/or 227) may receive digital data that is to be sent out to wireless devices, such as endpoints, via a wireless connection. The radio may convert the digital data into a radio signal having the appropriate center frequency, bandwidth parameters, and transmission power. The power distribution for the radio signal may have been determined and applied to each subcarrier at base station 210, or the power distribution may be determined at base station 210 and applied by remote transceivers 220. Similarly, the radios may convert radio signals received via the antenna into digital data to be processed by, for example, processor 211 (and/or 221). In some embodiments, base station 210 may process the data by, for example: Determining the received power from each endpoint at each remote transceiver 220; generating a power matrix comprising 1's and 0's based on the received power; solving linear equations based on the power matrix; comparing the result of the solution to a previous result; if the result (e.g., the value of the objective function) is an improvement checking if the solution of the linear equations provides an acceptable solution to the Karuch-Kuhn-Tucker (KKT) optimality conditions; if the solution of the linear equations provides an acceptable solution, determining the power distribution based on the solution of the linear equations; and if the result is not an improvement or the solution of the linear equations does not provide an acceptable solution to the KKT conditions, generating a new power matrix based on the received power.

Depending on the embodiment, interface 217 (and/or 227) may be any type of interface suitable for any type of network for which distributed antenna system 200 is used. As an example and not by way of limitation, distributed antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, distributed antenna system 200 may communicate with a wireless PAN (WPAN) (such as, for example, a BLUETOOTH WPAN), an OFDM network, a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 210 (and/or remote transceivers 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and base station 210 (and/or remote transceivers 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 217 (and/or 227) for them. Where appropriate, interface 217 (and/or 227) may include one or more device or encoded software drivers enabling processor 211 (and/or 221) to drive one or more of these I/O devices. Interface 217 (and/or 227) may include one or more interfaces 217 (and/or 227), where appropriate.

In particular embodiments, interface 217 (and/or 227) may include one or more wired interfaces configured to communicate with module 219 (and/or 229). For example, in some embodiments the wired interface may comprise an interface compatible with any type of BUS, such as an Advanced Technology Attachment (ATA) BUS. As another example, the wired interface may comprise an interface compatible with any type of interconnect interface such as Ethernet, Gigabit Ethernet, RaipidIO, Sub-Miniature version A (SMA), etc. The module may be installed in base station 210 and/or remote transceiver 220 to change, supplement, or otherwise modify the functionality of the base station 210 and/or remote transceiver 220.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a tangible, non-transitory computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Module 219 may be installed when transitioning a base station (e.g., a macro base station) to a remote transceiver controller. Module 219 may be optional in that, in some embodiments, processor 211 and interface 217 of base station 210 may be able to provide remote transceiver functionality without module 219 (e.g., via an update to the encoded software used by base station 210). Module 219 may be installed in a slot or receptacle specifically configured to receive module 219. In certain embodiments, module 219 may be configured to be installed in a standard equipment rack. For example, one or more components of macro base station 210 may be installed in a standard equipment rack, module 219 may be configured to be installed in the existing standard equipment rack. In addition, module 219 may include an interface configured to connect to interface 217 (e.g., via a standard port or a unique port specific to module 219) or bus 212. In certain embodiments, module 219 may include a processor similar to any of the processors discussed above with respect to processor 211. The processor of module 219 may, among other tasks, be used in generating control commands for remote transceivers 220. The control commands may relate to any of a variety of parameters associated with remote transceivers 220 (e.g., frequency, channel, time slot, bandwidth, power, etc.). Depending on the embodiment, the processor of module 219 may work alone or in conjunction with processor 211.

Module 229 may be installed when transitioning a remote transceiver to, for example, a pico base station. Module 229 may be optional in that, in some embodiments, processor 221 and interface 227 of remote transceiver 220 may be able to provide the functionality of module 229 without module 229 (e.g., via an update to the encoded software used by remote transceiver 220). Module 229 may be configured to be installed in a slot or receptacle specifically configured to receive module 229. In certain embodiments, module 229 may be configured to be installed in a standard equipment rack or card slot. For example, the components of remote transceiver 220 may be installed in a standard equipment, module 229 may be configured to be added to the existing standard equipment rack. Module 229 may also include an interface configured to connect to interface 227 (e.g., via a standard port or a unique port specific to module 229) or bus 222. In certain embodiments, module 229 may include a processor similar to any of the processors discussed above with respect to processor 221. The processor of module 229 may, among other tasks, be used in locally generating control commands for remote transceiver 220a. Thus, remote transceiver 220a may be able to provide wireless connections without requiring control commands from base station 210. Depending on embodiment, the processor of module 229 may work alone or in conjunction with processor 221. The module may also include an interface, or it may configured interface 227, to establish an IP based backhaul connection to a network without having to go through base station 210.

The components and devices illustrated in FIG. 2 form distributed antenna system 200. Distributed antenna system 200 may be one of many phases of a deployment scheme for a wireless network. From the perspective of an endpoint, distributed antenna system 200 may appear as a single base station. An endpoint may be unable to distinguish between a wireless transmission sent by remote transceiver 220a and a wireless transmission sent by remote transceiver 220b. The channel experienced by an endpoint is the sum of the channel responses from each of remote transceivers 220.

In particular embodiments, base station 210 may communicate with remote transceivers 220 using Common Public Radio Interface (CPRI). The CPRI specification supports a variety of topologies, including ring, tree, star, and chain topologies. The CPRI specification allows multiple remote transceivers 220 to be controlled by the same base station 210. In some embodiments, a CPRI link may be used by base station 210 to send/receive different in-phase/quadrature (I/Q) data to/from each different remote transceivers 220. For example, in some embodiments, base station 210 may apply the power distribution locally. This may result in each remote transceiver needing its own unique I/Q sample. In particular embodiments, the CPRI link may be used to send/receive a single set of I/Q samples from remote transceivers 220. For example, in some embodiments the power distribution may be applied individually at each respective remote transceiver. This may allow a single I/Q sample to be used by all remote transceivers 220.

The allocation of power to different subcarriers at different remote transceivers 220 for different endpoints in the power distribution may be based on the signal quality (e.g., the received power) associated with communications sent from each endpoint and received at each remote transceiver 220. In particular embodiments, base station 210 may allocate more power to those endpoints having better channel quality at each respective remote transceiver. Depending on the embodiment, there may be at least three components used to determine channel response: path loss, shadowing, and multipath. In contrast with shadowing and multipath effects (which are often random processes) path loss is the most dominant component in the channel response. Path loss may be a function of the distance between an endpoint and a remote transceiver. The closer an endpoint is to a particular remote transceiver, the higher the channel gain is between the endpoint and the remote transceiver. In distributed antenna system 200, the varying distances between an endpoint and each remote transceiver 220 may result in varying path losses and channel gains between remote transceivers 220 a particular endpoint.

In particular embodiments, the closer an endpoint is to a remote transceiver, the greater the power that will be allocated to the subcarriers associated with the endpoint. Conversely, the farther an endpoint is from a remote transceiver, the less power that will be allocated to subcarriers associated with the endpoint. This may allow each remote transceiver 220 to more efficiently use their available transmission power. The non-uniform power distribution to different subcarriers could enhance the signal to interference-plus-noise ratio (SINR) at the endpoint by increasing the received signal strength from the closer remote transceivers 220 while the loss of signal strength due to the reduced power from a more distant remote transceiver may be insignificant.

In particular embodiments, each remote transceiver 220 may measure the average received power of the subcarriers allocated to each endpoint. This information may then be delivered to base station 210 over a CPRI control channel. Base station 210 may use the measured uplink power to approximate the downlink channel response between each remote transceiver 220 and the endpoints. This estimation may be used by base station 210 to determine the power distribution which base station 210 may then send to remote transceivers 220 using the CPRI control channel.

In some embodiments, each remote transceiver 220 may send their own respective I/Q data along with I/Q data received from the upstream remote transceiver. Base station 210 may use the individual I/Q samples to estimate the received downlink power at the endpoint (e.g., it may be proportional to the determined uplink power). Using this estimated power, base station 210 may determine and apply an amount of amplification or attenuation to the download signal. This may be done without adjusting the phase of the download signal. The amplified data may then be sent to remote transceivers 220 as individual I/Q data.

In certain embodiments, before base station 210 allocates the distribution of power, it may first execute a scheduling algorithm to allocate subcarriers within a channel to the different endpoints. Once the subcarriers have been assigned, base station 210 may use the measured uplink power received from remote transceivers 220 to redistribute the downlink power to maximize system capacity. Depending on the embodiment and/or scenario, base station 210 could use any of a variety of strategies to apply power distribution. For example, base station 210 may be able to determine an optimum power distribution by applying KKT optimality conditions with the following optimization formula:

$$\max_{\{G_{rn}\}} f(\vec{G}) + \sum_{m=1}^{N_M} S_m \cdot \ln\left(1 + \sum_{r=1}^{N_R} K_{rm} \cdot G_{rm}\right)$$

$$\text{s.t.} \sum_{m=1}^{N_M} S_m \cdot G_{rm} = N \; \forall \, r = 1, \ldots, N_R$$

$$G_{rm} \geq 0 \; \forall \, r = 1, \ldots, N_R; \; m = 1, \ldots, N_M$$

in which: (1) $S_M$ may represent the number of subcarriers allocated to endpoint m; (2) $G_{rm}$ may represent the power amplification factor at remote transceiver r for all the subcarriers allocated to endpoint m; (3) $K_{rm}$ may represent the indicator of signal quality which may be proportional to the power received by remote transceiver r from endpoint m; (4) N may represent the number of subcarriers in a channel; (5) $N_R$ may represent the number of remote transceivers controlled by base station 210; and (6) $N_M$ may represent the number of the endpoints which are scheduled by base station 210 to receive data in one frame.

In certain embodiments, base station 210 may use the following Lagrangian function of the optimization problem determining an optimum power distribution:

$$L(\vec{G}, \vec{\lambda}, \vec{\mu}) = \sum_{m=1}^{N_M} -S_m \ln\left(1 + \sum_{r=1}^{N_R} K_{rm} G_{rm}\right) + \sum_{r=1}^{N_R} \lambda_r \left(\sum_{m=1}^{N_M} S_m G_{rm} - N\right) - \sum_{r=1}^{N_R} \sum_{m=1}^{N_M} \mu_{rm} G_{rm}$$

in which μ and λ are Lagrangian coefficients.

In certain embodiments, the equations associated with the KKT optimality conditions may be expressed as follows:

$$\frac{\partial L}{\partial G_{rm}} = 0 \Rightarrow \sum_{j=1}^{N_R} K_{jm} G_{jm} - \frac{S_m \cdot K_{rm}}{S_m \cdot \lambda_r - \mu_{rm}} = -1 \quad \text{(KKT 1)}$$

$$\forall r = 1, \ldots, N_R; \quad m = 1, \ldots, N_M$$

$$\sum_{m=1}^{N_M} S_m \cdot G_{rm} = N \quad \forall r = 1, \ldots, N_R \quad \text{(KKT 2)}$$

$$G_{rm} \geq 0 \quad \forall r = 1, \ldots, N_R; \quad m = 1, \ldots, N_M \quad \text{(KKT 3)}$$

$$\mu_{rm} \cdot G_{rm} = 0 \quad \forall r = 1, \ldots, N_R; \quad m = 1, \ldots, N_M \quad \text{(KKT 4)}$$

$$\mu_{rm} \geq 0 \quad \forall r = 1, \ldots, N_R; \quad m = 1, \ldots, N_M \quad \text{(KKT 5)}$$

The variables in equations KKT 1 through KKT 5 include $G_{rm}$, $\lambda_r$, and $\mu_{rm}$ in which the number of variables are $(N_R \cdot N_M)$, $N_R$, and $(N_R \cdot N_M)$, respectively ($N_R$ may represent the number of remote transceivers and $N_M$ may represent the number of endpoints which are scheduled by base station 210 to receive data in one frame). Thus, the total number of variables in the KKT optimality condition equations may be $(2 \cdot N_R \cdot N_M + N_R)$. Fortunately, there also exist $(2 \cdot N_R \cdot N_M + N_R)$ KKT optimality equations in KKT 1, 2, and 4. By solving these three sets of equations, it may be possible to find a global optimal solution.

Particular embodiments, may avoid the time and/or computational cost of solving the non-linear equation of KKT 1 and 4, by using an intelligent heuristic algorithm to transform KKT 1 and 4 into a linear problem that may be solved in a greedy manner. When $G_{rm}$, the power amplification factor of endpoint m at remote transceiver r, is positive the corresponding Lagrangian multiplier, $\mu_{rm}$, is equal to zero (see e.g., KKT 4). Then, KKT 1 may be simplified as a linear equation of $\{G_{jm}\}_{j=1 \sim N_R}$ and the inverse of the Lagrangian multiplier, $\lambda_r$:

$$\sum_{j=1}^{N_R} K_{jm} G_{jm} - \frac{K_{rm}}{\lambda_r} = -1$$

If it is assumed that the set of the positive power amplification gain, $\{G_{rm} > 0\}$, is known, the KKT optimality conditions equations can be transformed into linear equations: A·X=B, where:

1) X is a $(N_R \cdot N_M + N_R) \times 1$ column vector, $$X = (G_{11}, \ldots, G_{N_R 1}, G_{12}, \ldots, G_{N_R 2}, \ldots, G_{1N_M}, \ldots, G_{N_R N_M}, 1/\lambda_1, \ldots, 1/\lambda_{N_R})^T.$$

2) A is a $(N_R \cdot N_M + N_R) \times (N_R \cdot N_M + N_R)$ square matrix. Its $((\dot{y}-1) \cdot N_R + x)$-th row corresponds to the equation of $G_{r=x, m=y}$ in KKT 1. If $G_{xy}$ is greater than zero, the $((y-1) \cdot N_R + x)$-th row vector is:

$$\begin{bmatrix} (y-1) \cdot N_R 0s & & & (N_M - y) \cdot N_R 0s & (x-1) & & \\ 0\ 0 \ldots 0 & K_{1y} & \ldots & K_{N_R y} & 0\ 0 \ldots 0 & 0\ 0 \ldots 0 & -K_{xy}\ 0 \ldots 0 \end{bmatrix}$$

On the other hand, if $G_{xy}$ is equal to zero, the $((y-1) \cdot N_R + x)$-th row vector of the matrix A can be simply the row vector with all elements equal to zero except the $((y-1) \cdot N_R + x)$-th element which may be equal to one (e.g., $$\begin{bmatrix} (y-1) \cdot N_R + (x-1) 0s & & \\ 0\ 0 \ldots 0\ 0 & 1\ 0 & \ldots\ 0 \end{bmatrix}).$$

The $(N_R \cdot N_M + r)$-th ($r=1 \sim N_R$) row vector of the matrix A may correspond to an equation in KKT 2. The $(N_R + 1)$-th to $(N_R \cdot N_M + N_R)$-th row vectors can presented as a concatenation of a series of $N_M$ scalar matrices and a zero matrix:

$$[a_{ij}]_{i=N_R \cdot N_M + 1, \ldots, N_R \cdot N_M + N_R; j=1, \ldots, N_R \cdot N_M + N_R} = (S_1 \cdot I_{N_R} \cdot \cdot \cdot S_{N_M} \cdot I_{N_R}, 0_{N_R})$$

where $I_{N_R}$ is the $N_R \times N_R$ identity matrix.

3) B is a $(N_R \cdot N_M + N_R) \times 1$ column vector. Its $((y-1) \cdot N_R + x)$-th element, $B_{(y-1) \cdot N_R + x}$, is equal to $-1$ if $G_{xy}$ is greater than zero; otherwise, $B_{(y-1) \cdot N_R + x}$ is equal to zero. The $(N_R \cdot N_M + 1)$-th to $(N_R \cdot N_M + N_R)$-th elements of the vector B may all be equal to N.

In certain embodiments, the elements of the matrices A and B may depend on the selection of positive power amplification gain. Thus, base station 210 may select a subset of combinations from among all the possible combinations of endpoints and remote transceivers before transforming the KKT equations into linear equations. However, it may not be desirable to try every possible combination because the total number of possible combinations may grow exponentially. Rather, certain embodiments may use an intelligent heuristic algorithm to identify the candidates of the positive power amplification gain in a greedy manner.

In certain instances, the algorithm may begin by searching for an initial set $\{G_{rm}\}$ of pairings with positive power amplification gain. Each pairing may represent a combination of one endpoint and one remote transceiver. For example, if there were two endpoints in the depicted embodiment, there would be six pairings ((2 endpoints)*(3 remote-transceivers) =6 pairing). Based on the equality constraint in KKT 2, for each remote transceiver r, there exists at least one positive power amplification gain, $G_{rm} > 0$, assigned to an endpoint m. In certain embodiments and/or scenarios, pairings having a higher received power (e.g., higher $K_{rm}$ value as discussed below) may result in a higher objective value. The objective value may be derived from the objective function which may be designed to distribute power so as to maximize the overall system capacity. Thus, certain embodiments may, for each remote transceiver, select the pairing having the highest received power. Moreover, to ensure that each endpoint has at least some positive power amplification gain for at least one remote transceiver, base station 210 may, for each endpoint that is not included in any of the initially selected pairings, determine the pairing having the greatest received power.

In some embodiments, the indicator of signal quality, which may be proportional to the received power, may be computed as $$K_{rm} = \frac{c \cdot P_{rm}^{UL}}{N_T \cdot \sigma_n^2}$$

where c may represent a constant used to calibrate the differences between the transmitting and receiving antenna gains of downlink and uplink connections; $P_{rm}^{UL}$ may represent the average of the received uplink power of a subcarrier allocated to the m-th endpoint at the r-th remote transceiver; $N_T$ may represent the number of the transmitting antennas at each remote transceiver; and $\sigma_n^2$ may represent the variance of the noise power per subcarrier.

After determining the initial set of positive power gain $\{G_{rm} > 0\}$, the matrices A and B may be determined and used to solve linear equations of A*X=B. The solution to X may be a potential solution of the optimization problem, $\{G_{rm}\}$. This potential solution may be compared with a previous solution to determine whether the value of the objective function is improved. If the value of the objective function, based on the potential solution, is an improvement over the previous solution, then the potential solution may be accepted for the possible final solution. The potential solution may then be tested to determine if it satisfies the KKT optimality conditions (e.g., KKT 1-5).

In certain embodiments, the Lagrangian multiplier, $\mu_{rm}$ can be computed as:

$$\mu_{rm} = S_m \cdot \left( \lambda_r - \frac{K_{rm}}{1 + \sum_{j=1}^{N_R} K_{jm} G_{jm}} \right)$$

Then a check may be made to determine if the set of the complete solution $\{G_{rm}, \lambda_r, \text{ and } \lambda_{rm}\}$ satisfies the KKT condition equations by computing one or more individual error values based on:

$$\text{Error}_{rm} = \sum_{j=1}^{N_R} K_{jm} G_{jm} - \frac{S_m \cdot K_{rm}}{S_m \cdot \lambda_r - \mu_{rm}} + 1$$

$$\forall r = 1, \ldots, N_R; \quad m = 1, \ldots, N_M$$

If all Error$_{rm}$ values are below a tolerance threshold then the solution satisfies the KKT optimality condition equations and may be considered a global optimal solution.

On the other hand, if one or more Error$_{rm}$ values exceed the tolerance threshold then the potential solution may not be considered to be the optimal solution since it does not satisfy the KKT conditions. If this occurs, then the next candidate for a positive power gain is determined to improve the objective value.

In some embodiments, a heuristic approach may be used to determine the next candidate pairing of positive $G_{xy}$ from the descending order of $\{K_{rm}\}_{r=1 \sim N_R, m=1 \sim N_M}$. In certain embodiments, before the next candidate is considered, a potential next candidate may be tested to determine if it will increase the result of the objective function without solving the converted linear equations. For example, the potential next candidate $G_{xy}$ may be used improve the objective value if the following inequality holds:

$$\frac{K_{xy}}{1 + \sum_{j=1}^{N_R} K_{jy} G_{jy}} > \frac{K_{xm}}{1 + \sum_{j=1}^{N_R} K_{jm} G_{jm}} \quad \forall \text{ any } G_{xm} > 0.$$

Once the next candidate has been determined, both matrices A and B may be updated. The $((y-1) \cdot N_R + x)$-th row of the matrix A may be replaced by the row vector $$\begin{bmatrix} (y-1) N_R 0s & & (N_M - y) N_R 0s & (x-1) & & \\ 0 \; 0 \ldots 0 & K_{1y} \ldots K_{N_R y} & 0 \; 0 \ldots 0 & 0 \; 0 \ldots 0 & -K_{xy} & 0 \ldots 0 \end{bmatrix}$$

while the $((y-1) \cdot N_R + x)$-th element in vector B may be changed from 0 to −1. The new solution may be obtained by solving the linear equations based on the updated matrices A and B.

The above algorithm may be repeated until either a solution is found that satisfies the KKT optimality conditions or the last candidate with the smallest received power (e.g., the smallest $K_{rm}$) is evaluated. In the worst case, there may be at most $(N_R \cdot N_M)$ iterations. The computing time in each iteration may be based on spending at most $O(N_R^2 \cdot N_M^2)$ in solving linear equations. Therefore, the complexity of the proposed algorithm may be $O(N_R^3 \cdot N_M^3)$.

Once base station 210 has determined how to allocate the downlink power for the various subcarriers at each remote transceiver 220, the power distribution may be applied either at base station 210 or at remote transceivers 220. For example, in some embodiments, base station 210 may generate I/Q data for each remote transceiver 220 that includes the core data modified by the power distribution (this may be done in the frequency domain before base station 210 performs Inverse Discrete Fourier Transform (IDFT) operations). As another example, in some embodiments, base station 210 may send the core data and power distribution information separately. For example, the core data may be sent via the CPRI data link, and the power distribution information may be sent via the CPRI control session. This may allow each remote transceiver 220 to apply the power distribution locally. This may further allow base station 210 to send the same (frequency-domain) data to each remote transceiver 220 thereby reducing the data rate needed for the CPRI link.

Thus far, several different embodiments and features have been presented. Particular embodiments may combine one or more of these features depending on operational needs and/or component limitations. This may allow for great adaptability of distributed antenna system 200 to the needs of various organizations and users. Some embodiments may include additional features.

Figure 3A:
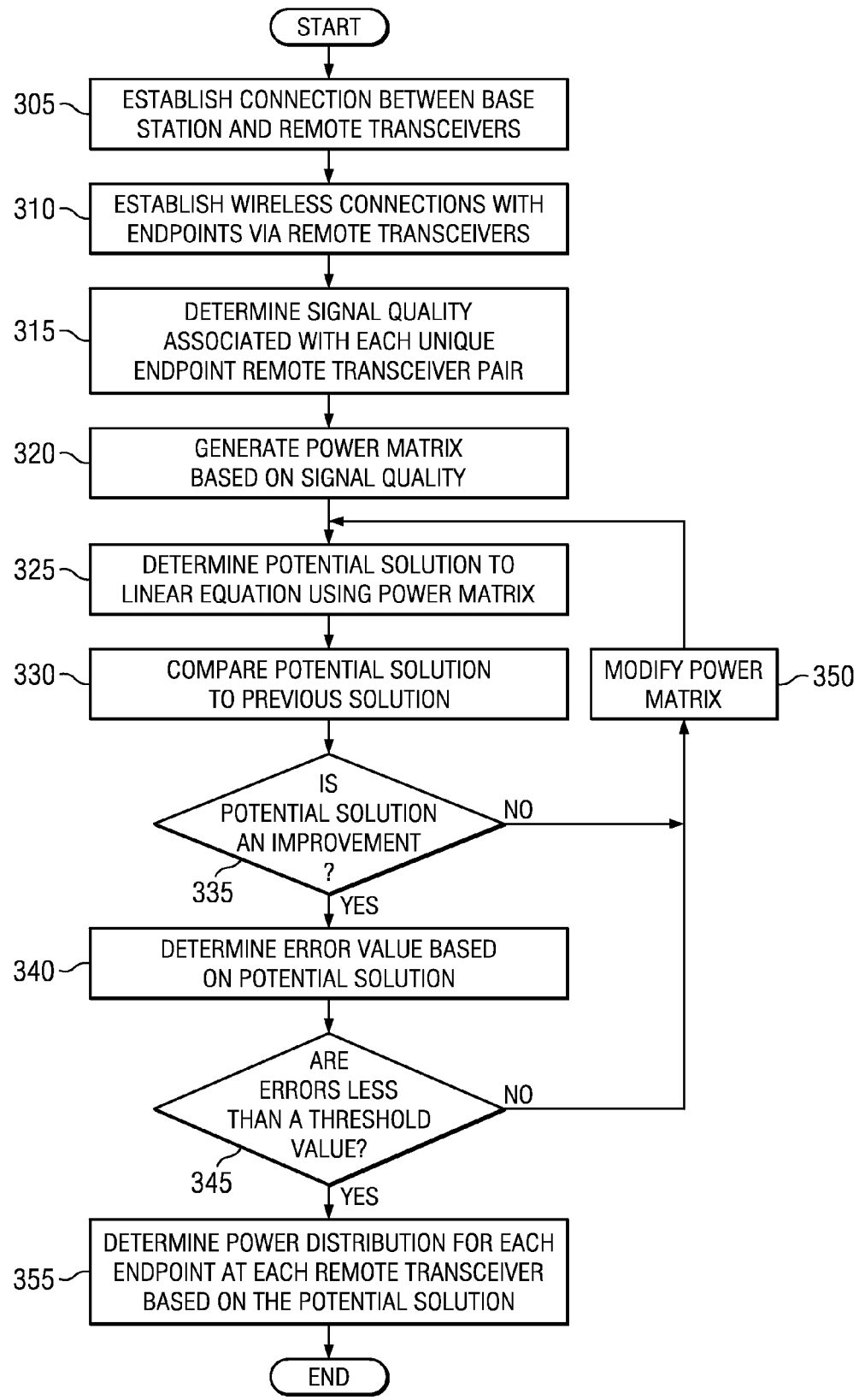
FIG. 3A illustrates a method for implementing power distribution within a distributed antenna system, in accordance with a particular embodiment.

FIG. 3A illustrates a method for implementing power distribution, in accordance with a particular embodiment. FIG. 3B illustrates several sample models to help illustrate corresponding steps in the method depicted in FIG. 3A, in accordance with a particular embodiment. The sample models depicted in FIG. 3B are numbered to correspond to a respective step in the method depicted in FIG. 3A. For example, the signal quality matrix depicted in model 315*b* corresponds to step 315. For purposes of simplicity, the illustrated steps of the method for the depicted embodiment are from the perspective of a base station. The base station is responsible for managing a plurality of remote transceivers in a distributed antenna system.

The method begins at step 305 with the establishment of connections between a base station and a plurality of remote transceivers. In some embodiments the connection between the base station and the plurality of remote transceivers may comprise a Common Public Radio Interface connection. At step 310 a plurality of wireless connections are established with a plurality of endpoints. The wireless connections are established via one or more of the plurality of remote transceivers. While each endpoint, from its perspective, may have established a single wireless connection with a single base station, each endpoint may actually be sending and receiving communications from a number of remote transceivers. It may be helpful to think of these connections as pairings. A pairing may represent a connection between one remote transceiver and one endpoint.

Model 310*b* depicts a scenario in which wireless connections are established with two endpoints (EP-A and EP-B) via three remote transceivers (RT-X, RT-Y, and RT-Z). This configuration results in six unique pairings (XA, XB, YA, YB, ZA, and ZB). More specifically, there are two pairings (one for each of endpoints (EP-A and EP-B) associated with each of the three remote transceivers (RT-X, RT-Y, and RT-Z).

At step 315 a signal quality is determined for each unique pairing. Each signal quality indication may comprise information from which the base station may be able to determine the relative quality, strength, and/or efficiency of a wireless connection between the respective remote transceiver and the respective endpoint. For example, if a particular remote transceiver is able to receive a signal from two endpoints, the signal quality indication sent from the particular remote transceiver would include information regarding the relative quality, strength, and/or efficiency of a wireless connection with both of the two endpoints. In certain embodiments, the signal quality indication may be based on the received power. That is, the signal quality associated with pairing XA may be based on the received power of a communication from EP-A received by RT-X. Model 315b illustrates an R by M sized signal quality matrix, $K_{RM}$, in which R is the number of remote transceivers (three) and M is the number of endpoints (two). The values provided are to aid in the example and do not necessarily represent actual signal quality values or received power values.

At step 320 a power matrix is generated based on the determined signal quality. The power matrix may comprise the same dimensions as the signal quality matrix. In certain embodiments, the power matrix may be initialized to all 0s. This is shown in model 320b-1. Next, for each remote transceiver, the endpoint having the highest received power is noted as a 1 in the corresponding element of the power matrix. This is shown in model 320b-2. In particular, endpoint EP-A has the best signal at each of the three remote transceivers. Next, for each endpoint that has not been assigned any positive power gain, the remote transceiver with the best signal for that endpoint is noted as a 1 in the corresponding element of the power matrix. In model 320b-2 it can be seen that there are no is for endpoint EP-B, thus a 1 is noted for the ZB pairing because the signal from endpoint EP-B is best received at remote transceiver RT-Z. This is shown in model 320b-3.

At step 325 a potential solution is determined to linear equations using the power matrix. In some embodiments, the linear equation may be of the form A*X B, where the solution for X is the potential solution. As discussed in more detail below, A and B may be formed based on the power matrix and the signal quality for each pairing.

A is a $(N_R \cdot N_M + N_R) \times (N_R \cdot N_M + N_R)$ square matrix (9×9 in FIG. 3B). Its $((y-1) \cdot N_R + x)$-th row corresponds to the equation of $G_{r=x,m=y}$ in KKT 1. If $G_{xy}$ is greater than zero, the $((y-1) \cdot N_R + x)$-th row vector is:

$$\begin{bmatrix} \overset{(y-1)\cdot N_R 0s}{0\,0\,\ldots\,0} & K_{1y} & \ldots & K_{N_R y} & \overset{(N_M-y)\cdot N_R 0s}{0\,0\,\ldots\,0} & \overset{(x-1)}{0\,0\,\ldots\,0} & -K_{xy} & 0 & \ldots & 0 \end{bmatrix}.$$

On the other hand, if $G_{xy}$ is equal to zero, the $((y-1)\cdot N_R + x)$-th row vector of the matrix A can be simply the row vector with all elements equal to zero except for the $((y-1)\cdot N_R + x)$-th element equal which may be equal to one (e.g., $$\begin{bmatrix} \overset{(y-1)\cdot N_R + (x-1)0s}{0\,0\,\ldots\,0\,0} & 1 & 0 & \ldots & 0 \end{bmatrix}).$$

The $(N_R \cdot N_M + r)$-th ($r = 1 \sim N_R$) row vector of the matrix A may correspond to an equation in KKT 2. The $(N_R \cdot N_{14}+1)$-th to $(N_R \cdot N_M + N_R)$-th row vectors may be presented as a concatenation of a series of $N_M$ scalar matrices and a zero matrix:

$$[a_{ij}]_{i=N_R \cdot N_M+1,\ldots,N_R \cdot N_M + N_R; j=1,\ldots,N_R \cdot N_M + N_R} = (S_1 \cdot I_{N_R} \ldots S_{N_M} \cdot I_{N_R}, 0_{N_R})$$

where $I_{N_R}$ is the $N_R \times N_R$ identity matrix. For simplicity, the value of the number of subcarriers assigned to each endpoint is represented by the letter Q and elements of the $(N_R \cdot N_M + 1)$-th to $(N_R \cdot N_M + N_R)$-th row are represented in matrix A in model 325b.

B is a $(N_R \cdot N_M + N_R) \times 1$ column vector. Its $((y-1)\cdot N_R + x)$-th element, $B_{(y-1)\cdot N_R + x}$, is equal to $-1$ if $G_{xy}$ is greater than zero; otherwise, $B_{(y-1)\cdot N_R + x}$ is equal to 0. The zero; $(N_R \cdot N_M + 1)$-th to $(N_R \cdot N_M + N_R)$-th elements of the vector B may all be equal to N, the number of subcarriers in a channel.

Once A and B have been defined, the equation A*X=B may be solved for X. X is a $(N_R \cdot N_M + N_R) \times 1$ column vector, $$X = (G_{11}, \ldots, G_{N_R 1}, G_{12}, \ldots, G_{N_R 2}, \ldots, G_{1N_M}, \ldots, G_{N_R N_M}, 1/\lambda_1, \ldots, 1/\lambda_{N_R})^T,$$

where $N_R$ is the number of remote transceivers (three in FIG. 3B) and $N_M$ is the number of endpoints (two in FIG. 3B). The resulting X may comprise the solution of power gains for each pair of remote transceiver and endpoint (indicated as G above) and Lagrangian multipliers (indicated as $\lambda$ above). The value of the objective function may be computed based on the solution of power gains. At step 330 the potential solution is compared to a previous solution to determine if the potential solution is an improvement. In certain embodiments, the comparison may be between the determined objective function and a previously determined objective function. At decision step 335, if the potential solution is an improvement over the previous solution the method continues to step 340, otherwise the method continues to step 350.

At step 350 the power matrix is modified. The modification may comprise updating the entry of one or more pairings in the power matrix. The updated entry may correspond to the next best signal determined from among the signals that have not already been identified. For example, the value associated with pairing XB in the power matrix may be updated to 1 because pairing XB has a better signal than pairing YB. In some embodiments, the power matrix may be modified by including a pairing that satisfies the following conditions:

$$\frac{K_{xy}}{1 + \sum_{j=1}^{N_R} K_{jy} G_{jy}} > \frac{K_{xm}}{1 + \sum_{j=1}^{N_R} K_{jm} G_{jm}} \quad \forall \text{ any } G_{xm} > 0$$

At step 340 one or more error values may be determined based on the potential solution. The error values may be determined using the following equation:

$$\text{Error}_{rm} = \sum_{j=1}^{N_R} K_{jm} G_{jm} - \frac{S_m \cdot K_{rm}}{S_m \cdot \lambda_r - \mu_{rm}} + 1$$

$$\forall r = 1, \ldots, N_R; \quad m = 1, \ldots, N_M.$$

At decision step 345, if one or more of the resulting $\text{Error}_{rm}$ values are greater than a threshold value, then the method proceeds to step 350 (discussed above); if the $\text{Error}_{rm}$ values are below the threshold, then the method proceeds to step 355. If the $\text{Error}_{rm}$ values are below the threshold, it may be determined that the potential solution satisfies the KKT optimality condition equations and is the global optimal solution.

At step 355 a power distribution is determined for each endpoint at each remote transceiver based on the potential solution. The power distribution determines the amount of amplification each remote transceiver is to use when transmitting wireless communications to each of the endpoints. In certain embodiments, the better (e.g., stronger, clearer, more efficient) a wireless signal is between a remote transceiver and an endpoint, the greater the amount of power the remote transceiver will use to communicate with the endpoint; conversely the worse a wireless signal is, the less power the remote transceiver will use to communicate with the endpoint. Thus, the power distribution may not be uniform among the endpoints and/or remote transceivers.

Figure 4A:
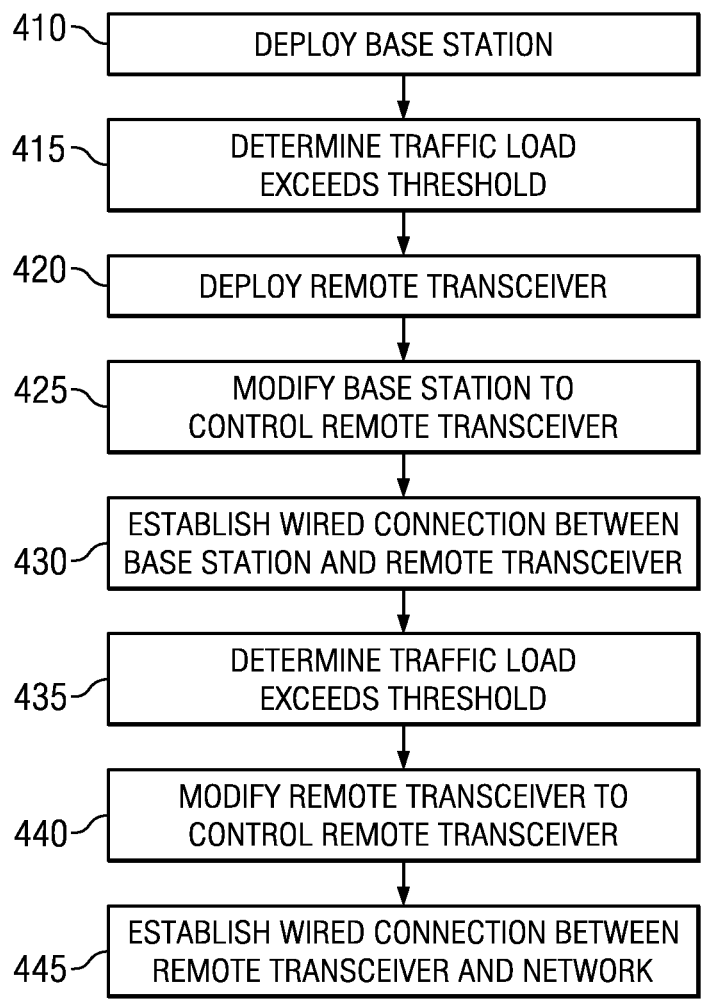
FIG. 4A illustrates a method for deploying a wireless network, in accordance with a particular embodiment.
Figure 4B:
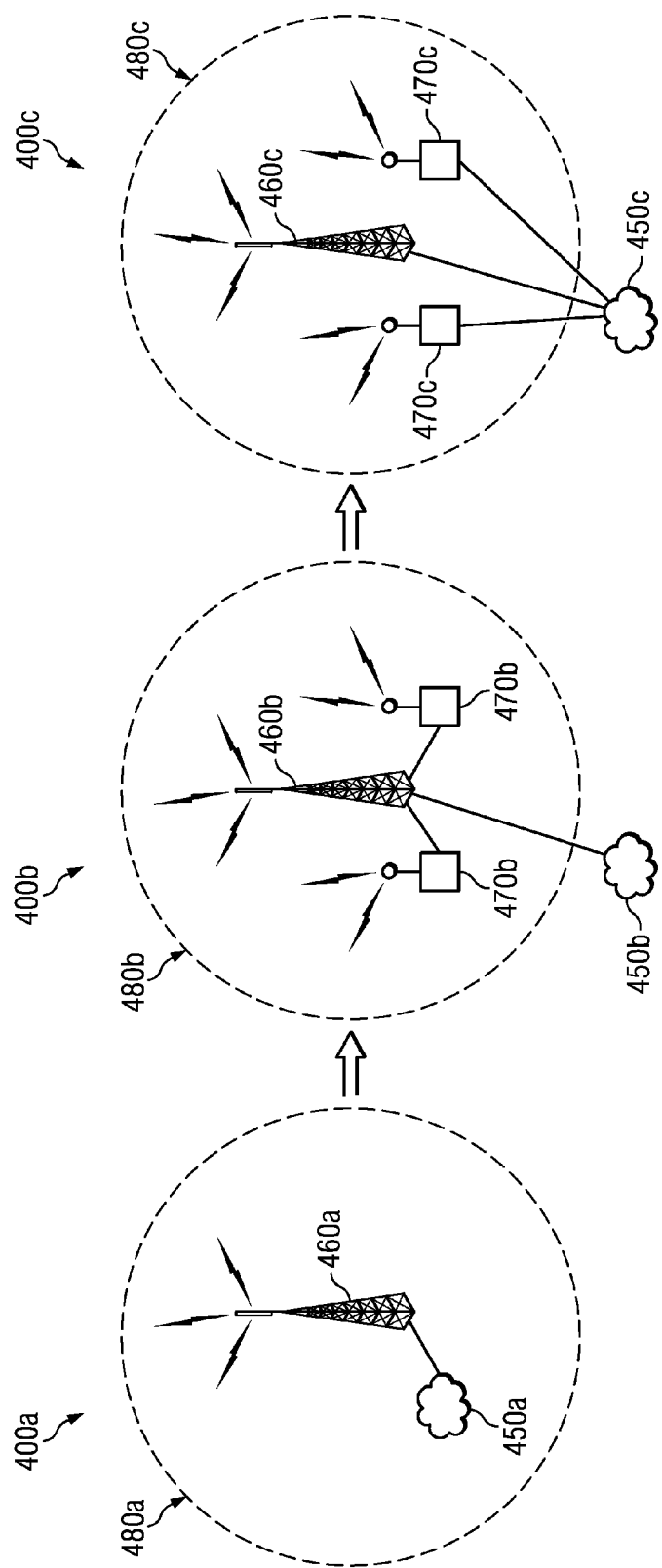
FIG. 4B illustrates different phases of a wireless network deployment scheme, in accordance with a particular embodiment.

FIG. 4A illustrates a method for deploying a wireless network, in accordance with a particular embodiment. FIG. 4B illustrates different phases of a wireless network deployment scheme, in accordance with a particular embodiment. The phases of FIG. 4B will be described in conjunction with the steps of FIG. 4A. The networks depicted in FIG. 4B are simple wireless networks depicted to illustrate the differences between phases in a wireless network deployment scheme in accordance with particular embodiments. For purposes of the depicted method, it may be assumed that a wireless service provider has decided to deploy a wireless network in a new geographic area. It may further be assumed that the service provider has decided to deploy the new wireless network in three phases 400 (see FIG. 4B).

The method begins at step 410 with the deployment of a base station. In certain embodiments, the deployed base station may comprise an interface configured to provide wireless connections between the base station and one or more endpoints. The deployed base station may be coupled to a wide area network, such as the Internet, through the wireless service provider's backhaul networks. This may allow the base station to provide the endpoints with wireless access to the Internet. The base station may also be able to locally determine and control the parameters of the wireless connections provided by the base station.

In particular embodiments, the base station may comprise a module receptacle and a wired interface configured to receive and facilitate communication with a module. The module may be configured to provide the base station with remote transceiver controller functionality. In some embodiments, the wired interface and/or the module receptacle may be configured specifically for a remote transceiver controller module. In some embodiments, the wired interface and/or the module receptacle may be generic such that a variety of different modules may be installed in, and may communicate with, the base station. For example, in some embodiments, the base station may comprise a standard equipment rack (e.g., a 19 inch rack mount) into which the module may be installed.

In FIG. 4B, phase 400a depicts the deployment of base station 460a. Base station 460a has a backhaul connection to network 450a. Network 450a may comprise any one or more of the networks described above with respect to FIGS. 1 and 2. Base station 210 may be configured to provide wireless connections to any endpoints within coverage area 480a.

At step 415 it is determined that a traffic load of the wireless connections exceeds a threshold. The threshold may be based on one or more of a variety of different factors. For example, the threshold may be based on the amount of data throughput through the base station, the number of endpoints being serviced by the base station at any given time, the average data rate or signal strength provide to the endpoints serviced by the base station, the cost of new and/or existing equipment or any other factor that may be indicative of a need or desirability to expand the capacity or coverage of the wireless network.

At step 420 remote transceivers are deployed. The remote transceivers may be configured to provide wireless connections between the remote transceivers and the endpoints and wired connections between the remote transceivers and the base station. Depending on the scenario and/or operational needs, the remote transceivers may be deployed to: (1) expand the coverage area provided by the already deployed base station; (2) improve the wireless signal quality in areas where the wireless signal from the already deployed base station is poor; (3) replace the wireless coverage of the base station with the wireless coverage of the remote transceivers; (4) provide additional capacity in areas where there is a relatively high concentration of endpoints; and/or (5) some combination of the above.

Depending on the scenario and/or embodiment, the deployed remote transceivers may comprise an interface and receptacle that may be used to install a module to convert the remote transceiver to a pico base station. The interface and module may be specifically configured to receive the pico base station module or they may be generic such that any of a variety of different types of modules may be installed therein. The unmodified remote transceiver may include a wireless interface that is used to establish the wireless connections with endpoints that may be within the coverage area of the remote transceiver. The remote transceiver may also have an interface that is used to establish a wired connection to a base station. The wired connection may be used to send and receive data and signaling (e.g., control commands) to and from the base station.

At step 425 the base station is modified to be able to control the remote transceivers. The modification of the base station may be implemented in a variety of ways depending on the configuration of the base station and/or the operational needs of the wireless service provider. For example, in some embodiments the base station may be modified via a software update uploaded to the base station via the backhaul connection. As another example, the base station may be modified by adding or replacing the hardware in the base station. For example, a module may be installed to provide the base station with remote transceiver controller functionality. In some embodiments, the modification may convert the base station from a macro base station to a remote transceiver controller. In such embodiments, the base station may no longer provide wireless connections directly to the endpoints. Rather, it may provide wireless connections through the remote transceivers. In some embodiments, the modification may provide remote transceiver controller functionality in addition to the macro base station functionality. In such an embodiment, the base station may continue to provide wireless connections directly to the endpoints as well as through the remote transceivers.

In those embodiments in which the base station is modified by installing a module, the module may be configured to provide, either alone or in conjunction with components already present in the base station, remote transceiver controller functionally (e.g., generating control commands for the remote transceivers). The module may comprise an interface configured to establish a CPRI connection with the remote transceivers. In some embodiments, the CPRI connection may be made via an optical wired connection. The module may also include a processor (e.g., an ASIC of an FPGA) that is able to generate control commands for the remote transceivers. The control commands may include all manner of signaling, including non-uniform power distribution, channel assignments, time slot assignments, or any other parameters the remote transceivers may need to communicate wirelessly with the endpoints. The control commands may be formatted to comply with the CPRI standard.

At step 430 wired connections are established between the base station and the remote transceivers. The wired connections may facilitate the base station's control over the remote transceivers. For example, the wired connections may allow the modified base station/remote transceiver controller to communicate data and/or signaling with the remote transceivers. For example, the wired connections may be used to communicate data sent to and/or received from the endpoints. As another example, the wired connections may be used to communicate information regarding the power distribution for each of the remote transceivers. In some embodiments the wired connections may be CPRI connections. The wired connections may be terminated at the installed module or at one or more interfaces already present in the unmodified base station.

After the remote transceivers have been deployed and the wired connections established, the base station may begin to generate and transmit control commands. The control commands may provide one or more parameters associated with the one or more remote transceivers. For example, the control commands may specify the power distribution. In some embodiments, the control commands may conform with the CPRI standard.

In FIG. 4B, phase 400*b* depicts the deployed remote transceivers 470*b* and base station 460*b*. In the depicted embodiment, remote transceivers 470*b* have been deployed to increase the coverage area of the wireless network, as shown by coverage area 480*b*. Remote transceivers 470*b* have a wired connection to base station 460*b* which provides a backhaul connection to network 240*b* for each of remote transceivers 470*b*.

At step 435, it is determined that the traffic load exceeds a threshold. The threshold may be based on any of the factors discussed above at step 415. It is not necessary for both thresholds to be based on the same factor or combination of factors. In certain embodiments, the threshold may be based on the load placed at particular remote transceivers.

At step 440 the remote transceivers are modified to control themselves. Once modified, the remote transceivers may no longer need the control commands from the base station in order to provide endpoints with wireless connections. In some embodiments, the remote transceivers may be converted to pico base stations.

In some embodiments, the modification may include converting the wired connection from a CPRI connection to an IP connection. As with the base station, the modification of the remote transceiver may be performed in any of a variety of ways. For example, the modification may be done via a software update or by installing a new hardware module. Depending on the needs or scenario, it may not be necessary to modify all the remote transceivers coupled to a particular base station.

In some embodiments in which the remote transceiver is modified by installing a module, the module may be configured to provide control for the wireless connection similar to what was previously provided by the base station. The module may include an interface configured to establish a wired IP connection to a wide area network, such as the internet, or to the wireless service providers network. The IP connection may provide the backhaul connection for the remote transceiver/pico base station. The module may also include a processor that is able to generate the control commands. The control commands may provide the various parameters of the wireless connections supplied by the pico base station.

At step 445 a wired connection is established between the remote transceivers and a network. In some embodiments the connection may be an IP based connection. The IP based wired connection may replace the CPRI based wired connection. Depending on the embodiment, the IP based wired connection may terminate at an interface on the module or the pico base station.

In FIG. 4B, phase 400*c* depicts remote transceivers 470*c* modified to be pico base stations. Each depicted remote transceiver/pico base station 470*c* has its own backhaul connection to network 450*c*, as does base station 460*c*. In the depicted scenario, base station 460*c* and pico base stations 470*c* may each manage their own coverage area. The individual coverage areas may overlap to create coverage area 480*c*. Coverage area 480*c* may be greater than coverage area 480*b*.

Although the depicted embodiment began with the deployment of a base station, in certain embodiments, the service provider may begin by deploying a distributed antennae system. In such an embodiment, the wireless service provider may begin by deploying the remote transceivers and the remote transceiver controller. The remote transceivers may be wired to the remote transceiver controller. The method may then proceed as above from step 435 to step 445.

Some of the steps illustrated in FIGS. 3A and 4A may be combined, modified or deleted where appropriate, and additional steps may also be added to the flowchart. Additionally, steps may be performed in any suitable order without departing from the scope of particular embodiments.

While various implementations and features are discussed with respect to multiple embodiments, it should be understood that such implementations and features may be combined, re-arranged or modified in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within distributed antenna system 100 such as endpoints, base stations and remote transceivers, these elements may be combined, rearranged or positioned in order to accommodate particular routing architectures or needs. In addition, any of these elements may be provided as separate external components to distributed antenna system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for deploying a wireless network, comprising:
deploying one or more base stations configured to provide wireless connections between the one or more base stations and one or more endpoints;

deploying one or more remote transceivers configured to provide wireless connections between the one or more remote transceivers and one or more endpoints;

modifying at least one base station of the one or more base stations, the modified base station configured to control the one or more remote transceivers; and modifying at least one remote transceiver of the one or more remote transceivers, the at least one remote transceiver modified to control the at least one remote transceiver without receiving control information from the at least one base station.

2. The method of claim 1, further comprising establishing a wired connection between the at least one base station and the one or more remote transceivers.

3. The method of claim 2, wherein establishing the wired connection comprises establishing a wired Common Public Radio Interface (CPRI) connection.

4. The method of claim 1, further comprising establishing a wired connection between the at least one remote transceiver and a network.

5. The method of claim 4, wherein establishing the wired connection comprises establishing a wired Internet Protocol connection.

6. The method of claim 1, wherein modifying the at least one base station of the one or more base stations comprises converting the base station from a macro base station to a remote transceiver controller.

7. The method of claim 1, wherein modifying the at least one remote transceiver of the one or more remote transceivers comprises converting the at least one remote transceiver to at least one pico base station.

8. The method of claim 1, further comprising, prior to modifying the at least one base station of the one or more base stations, determining that a traffic load of the one or more wireless connections provided by the one or more base stations has exceeded a threshold.

9. The method of claim 1, further comprising, prior to modifying the at least one remote transceiver of the one or more remote transceivers, determining that a traffic load of the one or more wireless connections provided by the one or more remote transceivers exceeds a threshold.

* * * * *